United States Patent Office 3,062,140
Patented Nov. 6, 1962

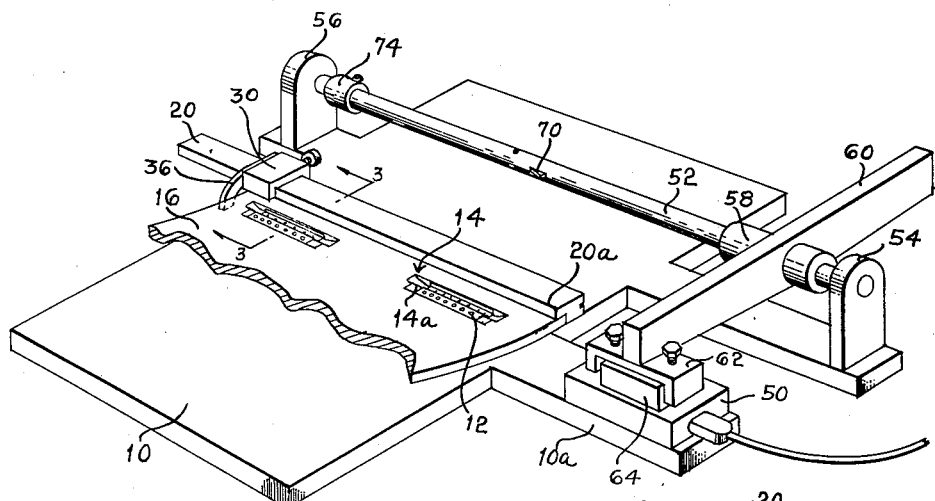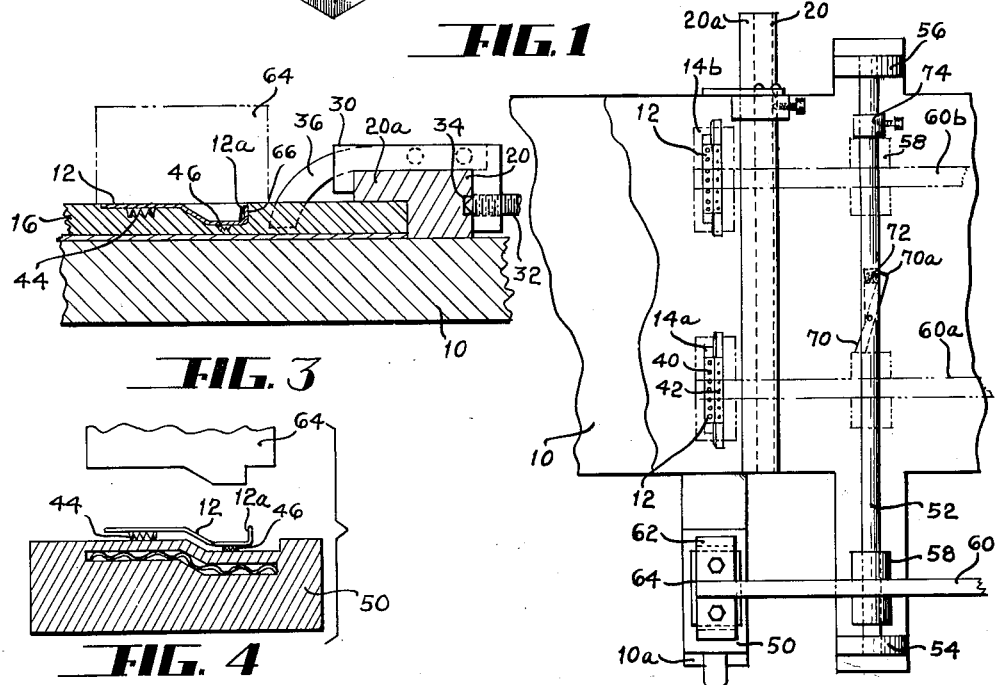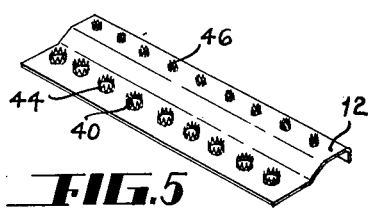

3,062,140
INTERNAL LOCK
Homer L. Bishop, Dayton, Ohio, assignor to Bista Inc., West Carrollton, Ohio, a corporation of Ohio
Filed June 22, 1959, Ser. No. 821,923
5 Claims. (Cl. 101—401.1)

This invention relates to an electrotype plate and more particularly to a scarf or scarves in the rear surface of electrotype plates used in connection with an internal lock-up for locking the electrotype plate upon a printing cylinder or plate support.

Broadly speaking, there are two methods of attaching an electrotype plate to a printing press. For example, when attaching an electrotype plate to a printing cylinder, the plate may be clamped in position by clamps engaging the margins of the plate so as to be pushing against the margins. When such clamps are used and are mounted to push against the ends of the electrotype plate, if the plate does not have the identical curvature to the cylinder, the clamps may tend to push the center of the plate away from the cylinder, in other words, a sloppy connection.

In order to overcome the objection to the use of clamps engaging the margins of an electrotype plate, internal lock-ups have been used. The internal lock-ups consist primarily of clamps mounted in grooves of the plate support, which clamps have projections projecting into scarves or recesses in the rear surface of the electrotype plate. One of the difficulties encountered when using the scarves is a tendency for the marginal portion of the electrotype plate, that is, the portion between the scarf and the outer margin, failing. The plastic material, whether it be lead or a thermoplastic material, used as a backing material for the shell fails for the reason that it hasn't sufficient strength. The clamps which are quite small exert a pressure over a limited area and, as a result thereof, the plate may fail by the clamps shearing through the marginal portion of the plate.

An object of this invention is to reenforce a scarf in the rear surface of an electrotype plate so that the reenforced scarf may be used in connection with an internal lock-up.

Another object of this invention is to provide a reenforcing member or insert that is manufactured from sheet metal and provided with tines, or prongs, or extensions adapted to be embedded in the electrotype plate to firmly hold the insert in position.

Another object of this invention is to provide a method of reenforcing the scarf of an electrotype plate wherein an insert is provided with teeth that are heated by coming into direct contact with the heater element so as to heat the teeth to a higher temperature than the remaining portion of the insert.

Other objects and advantages reside in the construction of parts, the combination thereof, the method of manufacture and the mode of operation, as will become more apparent from the following description.

Referring to the drawings:

FIGURE 1 is a perspective view of a portion of a curved electrotype plate mounted upon a support associated with a mechanism for heating and inserting the insert in the scarves of an electrotype plate.

FIGURE 2 is a fragmentary view of a portion of the device shown in FIGURE 1.

FIGURE 3 is a cross sectional view taken substantially on the line 3—3 of FIGURE 1.

FIGURE 4 is a fragmentary sectional view showing a heater element, in insert located on top of the heater element and a magnet member held above the insert in readiness to pick up the insert and apply it to the scarf.

FIGURE 5 is a perspective view of an insert as seen from the under side thereof.

Referring to the drawings, the reference numeral 10 indicates a base or bed of a device used in applying an insert 12 to a scarf 14 having two levels. The insert is used to reenforce the scarf 14 in an electrotype plate 16. A guide member 20 is provided with a lip 20a cooperating with the base 10 to form a channel into which the edge of an electrotype plate 16 is positioned. When the electrotype plate 16 is positioned in this channel, the scarf 14 is then positioned in a predetermined relation with respect to the guide member 20.

A bracket member 30 is mounted for slidable adjustment along the guide member 20. It may be locked in position by a screw 32 engaging a slot or recess 34 in the margin of the guide 20, the slot or recess 34 being arranged on the side opposite the channel for receiving the electrotype plate. A stop member 36 is secured to one margin of bracket member 30, against which one edge of the electrotype plate abuts. As will appear more fully later, the bracket member 30 and stop member 36 are adjusted to position various sizes of electrotype plates on the bed 10.

The insert used in reenforcing the scarf is made from a ferromagnetic material and has a number of holes 40 and 42 pierced therein. Although the insert is described as a ferromagnetic material, it may be made of any suitable metal or alloy, or it may be made from other materials having the desired characteristics. The holes 40 have a larger diameter than the holes 42. The metal from the holes 40 and 42 projects downwardly, as viewed in FIGURES 1 to 4, so as to provide teeth or projections 44 and 46 to be embedded in the plastic material forming the backing material of the electrotype plate. In FIGURE 5 the insert has been inverted and the teeth project upwardly. Due to the fact that the backing material of the electrotype plate consists of thremoplastic material that softens when subjected to heat, it has been found that by heating the insert and applying pressure to the insert, the teeth are embedded in the plastic material, so as to hold the insert in position. The device for heating the insert and for transferring the insert from the heater element to the scarves will now be described.

An electric heater element 50 is mounted onan extension 10a of the base. The upper surface of this heater element, as clearly shown in the cross sectional view in FIGURE 4, has been contoured in a manner similar to the insert 12. The teeth rest directly upon the heater element, so as to conduct heat from the heater element into the teeth 44 and 46 and finally into the main body. Due to the fact that the teeth are embedded in the plastic material forming the backing of the electrotype plate, the heater element has been arranged so as to heat the teeth to a hotter temperature than the main body of the insert.

As the teeth are pointed, these cool very rapidly when removed from the heater element. It is quite desirable to provide a mechanism for transferring the insert 12 from the heater element directly and rapidly to the scarf in the back surface of the electrotype plate.

The mechanism for transferring the insert from the heater element to the scarf and inserting a pressure on the insert when it is placed in the scarf includes a shaft or rod 52 fixedly mounted in standards or brackets 54 and 56 mounted upon the base 10. Although an electric heater has been shown, any other suitable heater may be used.

A tubular sleeve 58 is mounted for sliding movement within limits upon the shaft 52. A lever or handle 60 is attached to the sleeve 58. The outer end of this lever 60 supports a member 62 having mounted therein a permanent magnet 64. The lever 60 is actuated so as to place the magnet 64 directly above the insert 12, as clearly seen in FIGURE 4, the contour of the lower margin of the electromagnet corresponding to the upper surface of the insert 12. By rotating the handle 60, the magnet 64 and the insert 12 may be raised and slid laterally on the shaft 52 into the dot-dash position 60a where the sleeve 58 engages a stop 70 that is pivotally mounted in a slot in the shaft 52, so as to properly position the electromagnet with respect to the scarf 14a, shown in FIGURE 2. By raising the outer end of the handle 60, or rotating it in a counterclockwise direction, as viewed in FIGURE 1, it can readily be seen that a pressure can be exerted upon the insert 12, so as to embed the teeth 44 and 46 into the plastic material without distorting the plate beyond the scarf. As clearly shown in FIGURE 3, the outer margins of the magnet rest on the rear surface of the electrotype plate to limit the downward movement of the hot insert.

It is to be noted that the insert 12 has a vertical flange 12a. This vertical flange 12a abuts a vertical shoulder 66 of the scarf. The hook on the printing press of the internal lock-up, which has not been shown, engages the flange 12a which is firmly seated against the shoulder 66 to lock the electrotype plate on the press. The flange 12a provides a rigid support for the lock-up hook and distributes the force over a large area.

A second insert 12 is then placed upon the heater element which may be done by placing the insert on the under side of the magnet with the flange 12a abutting the vertical shoulder in the lower margin of the magnet 64, placing the insert and the magnet resting thereon on the heater element 50 sufficiently long to heat the teeth 44 and 46 to the desired temperature. The operation of moving the magnet and the parts associated therewith along the shaft 52 is substantially a duplicate of the insertion of the insert as described above, with one exception. By pressing upon the end 70a, so as to compress a spring 72, the sleeve 58 is advanced into the position 60b, shown in FIGURE 2, when the tubular sleeve 58 abuts a collar 74 adjustably mounted upon the shaft 52. The collar 74 is adjusted along the shaft, so as to cause the insert to register with the scarf 14b, as shown in FIGURE 2. The operation of pressing the insert into position as described in connection with the scarf 14a is then repeated.

After the inserts have been inserted on one end of the electrotype plate, the electrotype plate may be reversed end for end and the scarves on the opposite end of the electrotype plate may then be reenforced by a pair of inserts in a manner as described above.

In the event another size of electrotype is to be reenforced, member 30 is then adjusted so as to position the lower scarf corresponding to the scarves 14a in FIGURE 1, so that when the sleeve 58 engages the stop 70, the insert is properly positioned. The scarves on another size plate would either be further apart or closer together, depending entirely upon whether the plate is a larger plate or a smaller plate, respectively. In order to properly position the insert for the upper scarf, corresponding to the scarf 14b, the collar 74 is adjusted along the shaft, so as to properly position the insert.

In order to hold the electrotype plate firmly in position, shims may be placed in the channel formed by the lip 20a and the base, so as to hold the margin of the electrotype plate firmly against the base 10.

Although the process has been primarily developed for use with electrotype plates having a thermoplastic backing material, the same apparatus and the same type of insert could be used on an electrotype plate that is backed with lead. The shape of the insert and the shape of the scarves may be varied to meet the exacting demands in the industry.

The electrotype plate may be a curved plate or it may be a flat plate. The thickness of the plates varies somewhat, depending upon the particular press upon which the plate is to be used.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. The method of reenforcing a scarf for use with the internal lock-up of an electrotype plate having thermoplating backing for the shell thereof, said method including the steps of forming an insert from a sheet metal blank having a contour corresponding to the contour of the scarf, piercing holes in the blank so as to form a plurality of teeth projecting from the margins of the holes, placing the insert with the teeth resting upon a heating element, transferring the insert from the heating element to a scarf in the electrotype plate, pressing the insert to force the teeth into the thermoplastic backing material to fixedly secure the insert to the scarf to thereby reenforce the same.

2. The method of reenforcing a scarf for use with the internal lock-up for an electrotype plate, said plate having thermoplastic backing for the shell thereof, said method including the steps of forming an insert from a sheet metal blank having a contour corresponding to the contour of the scarf, forming teeth projecting from one side of the insert, heating the teeth of the insert, placing the insert upon the scarf, and pressing the insert to force the teeth into the thermoplastic backing material to fixedly secure the insert to the scarf to thereby reenforce the same.

3. The method of reenforcing a scarf for use with the internal lock-up for an electrotype plate, said plate having thermoplastic backing for the shell thereof, said method including the steps of forming an insert adapted to interfit said scarf from a sheet metal blank, forming teeth projecting from one side of the blank, forming a flange projecting upwardly from the blank along one margin thereof in a direction opposite from the teeth, heating the teeth, placing the insert upon the scarf in the electrotype plate, pressing the insert to force the teeth into the thermoplastic backing material, the flange abutting the wall of the scarf to fixedly secure the insert to the scarf to thereby reenforce the same.

4. The method of reenforcing a scarf of an electrotype plate, said plate having thermoplastic backing for the shell thereof, said scarf having two parallel surfaces on different levels, said scarf being adapted for an internal lock-up, said method including the steps of forming an insert from a sheet metal blank having a contour corresponding to the contour of the scarf so that the blank has portions lying in two levels, forming two sets of teeth in the blank projecting from one side thereof, one set of teeth being longer than the other set of teeth, forming a flange along one side to form an insert, said flange projecting in a direction opposite from the teeth, heating the teeth of the insert and forcing the teeth into the thermoplastic material so as to embed the same to anchor the insert, the flange extending along one wall of the scarf, the insert reenforcing the scarf.

5. An insert for reenforcing the base and one side wall of a scarf formed in an electrotype plate having a heat softenable backing, said insert comprising a sheet metal member having a base portion and side walls conforming to the corresponding sections of the scarf whereby the insert may be seated snugly in the scarf, and tooth portions integral with said sheet metal member projecting outwardly of the base portion thereof, the construction and arrangement being such that said insert, upon heating thereof, may be pressed into said scarf thereby forcing said tooth portions into said backing so as to secure the insert to the backing.

References Cited in the file of this patent

UNITED STATES PATENTS

| | | |
|---|---|---|
| 1,008,029 | Gormen | Nov. 7, 1911 |
| 1,044,283 | Stranger | Nov. 12, 1912 |
| 1,621,271 | Preisler | Mar. 15, 1927 |
| 2,180,732 | Durham | Nov. 21, 1939 |
| 2,558,269 | Reilly | June 26, 1951 |
| 2,596,253 | Kurkjian | May 13, 1952 |
| 2,666,979 | Van Dusen | Jan. 26, 1954 |
| 2,760,547 | Dempnock | Aug. 28, 1956 |
| 2,869,228 | Martin | Jan. 20, 1959 |

FOREIGN PATENTS

| | | |
|---|---|---|
| 448,615 | France | Dec. 2, 1912 |

UNITED STATES PATENT OFFICE
CERTIFICATE OF CORRECTION

Patent No. 3,062,140                                            November 6, 1962

Homer L. Bishop

It is hereby certified that error appears in the above numbered patent requiring correction and that the said Letters Patent should read as corrected below.

Column 1, line 70, for "in insert" read -- an insert --; column 4, lines 13 and 14, for "thermoplating" read -- thermoplastic --.

Signed and sealed this 23rd day of April 1963.

(SEAL)
Attest:

ERNEST W. SWIDER                                   DAVID L. LADD
Attesting Officer                                       Commissioner of Patents